(12) United States Patent
Murphy et al.

(10) Patent No.: US 12,517,274 B2
(45) Date of Patent: Jan. 6, 2026

(54) INTRUSION DETECTION ALGORITHM WITH WIND REJECTION HEURISTIC

(71) Applicant: Network Integrity Systems, Inc., Hickory, NC (US)

(72) Inventors: Cary R. Murphy, Hickory, NC (US); Daniel M. Goertzen, Winnipeg (CA); Mark K. Bridges, Hickory, NC (US)

(73) Assignee: Network Integrity Systems, Inc., Hickory, NC (US)

( * ) Notice: Subject to any disclaimer, the term of this patent is extended or adjusted under 35 U.S.C. 154(b) by 556 days.

(21) Appl. No.: 17/890,359

(22) Filed: Aug. 18, 2022

(65) Prior Publication Data

US 2024/0061137 A1 Feb. 22, 2024

(51) Int. Cl.
*G01V 1/36* (2006.01)
*G01V 1/00* (2024.01)
*G01V 1/22* (2006.01)

(52) U.S. Cl.
CPC ............... *G01V 1/36* (2013.01); *G01V 1/001* (2013.01); *G01V 1/226* (2013.01)

(58) Field of Classification Search
CPC .......... G01V 1/36; G01V 1/001; G01V 1/226; G08B 29/185; G08B 13/124; G08B 29/24
See application file for complete search history.

(56) References Cited

U.S. PATENT DOCUMENTS

| | | | | | |
|---|---|---|---|---|---|
| 5,084,696 | A | * | 1/1992 | Guscott | G08B 29/185 340/541 |
| 6,462,657 | B1 | * | 10/2002 | Perski | G08B 29/185 340/552 |
| 2007/0077064 | A1 | * | 4/2007 | Murphy | H04B 10/00 398/13 |

(Continued)

FOREIGN PATENT DOCUMENTS

| | | |
|---|---|---|
| CN | 101556724 | 10/2009 |
| CN | 108280950 | 7/2018 |

(Continued)

OTHER PUBLICATIONS

Wang, Y. et al., 'Study on CA-CFAR Algorithm Based on Normalization Processing of Background Noise for HI of Optical Fiber', Photonic Sensors; DOI: 10.1007/s13320-018-0498-5; vol. 8 No.4, Jul. 6, 2018, pp. 341-350.

(Continued)

*Primary Examiner* — Christopher M Brandt
*Assistant Examiner* — Asif Shameem
(74) *Attorney, Agent, or Firm* — Adrian D. Battison; Ade & Company Inc.; Ryan W. Dupuis (57) ABSTRACT

A method is provided for analyzing a monitoring signal from a sensing system to determine an alarm condition, where the monitoring signal is provided as a stream of digital values which are analyzed using a frequency-based transform to generate a set of transform coefficients which are compared to a set of envelope coefficients. The sensitivity of the (Continued)

analysis is automatically controlled to accommodate environmental noise on the fiber by increasing the envelope coefficients to make the analysis less sensitive at each cycle by adopting the larger value from the comparison and by decaying the envelope coefficients at each cycle over time to a smaller value down to a floor value.

21 Claims, 6 Drawing Sheets

(56) References Cited

U.S. PATENT DOCUMENTS

2010/0073163 A1    3/2010  Mahmoud et al.
2019/0074896 A1*  3/2019  Murphy ................. G01D 5/353

FOREIGN PATENT DOCUMENTS

| | | |
|---|---|---|
| CN | 110570613 | 12/2019 |
| EP | 3321859 | 5/2018 |

OTHER PUBLICATIONS

Mahmoud, S.S. et al., 'Elimination of rain-induced nuisance alarms in distributed fiber optic perimeter intrusion detection systems', Proc. SPIE 7316, Fiber Optic Sensors and Applications VI, 731604, Apr. 27, 2009, 11 pages.

\* cited by examiner

INTRUSION DETECTION ALGORITHM WITH WIND REJECTION HEURISTIC

This invention relates to a method of or algorithm for analyzing a monitoring signal from an optical fiber to detect intrusion attempts while rejecting signals generated by environmental effects such as wind. This is particularly applicable to perimeter security such as at a fence where an optical fiber extends along at least part of the fence and generates changes in a monitor signal transmitted along the fiber in response to any movement of the fiber caused by an intrusion attempt such as climbing, lifting or cutting. However the method herein can be used in relation to the monitoring of other fibers which can be moved in response to other types of intrusion events.

BACKGROUND OF THE INVENTION

While other systems are available for perimeter monitoring, the use of optical fibers has a number of advantages:

As glass contains no conductors, fiber optic sensors are inherently resistant to common electrical issues such as the need for local power for the sensor.

As the fiber optic sensor contains no metal conductors, it is resistance to effects of lightning which could, regard to an electrical conductor, cause damage to the head end interrogator.

As there is no electrical conductor, there is a decrease in shock hazard.

Additionally, no bonding of conductors or shields is required.

Fence mounted perimeter security systems typically consist of a head end interrogator which injects an optical signal into an optical fiber and analyses the returned signal. There are multiple technologies currently used for the detection of vibration and movement. Some common detection mechanisms include:

Modalmetric which senses changes in modal power distribution in a multimode fiber as used in the Sentinel II product manufactured by Network Integrity Systems and as shown for example in U.S. Pat. No. 7,092,586 (Vokey) issued Aug. 15 2006.

CW polarization which senses changes in polarization of a signal in a single mode fiber such as the single mode Interceptor and Vanguard products manufactured by Network Integrity Systems and as shown for example in U.S. Pat. No. 7,206,469 (Murphy) issued Apr. 17 2007.

Distributed Acoustic Sensing (DAS) where vibrations and displacements cause localized shifts in the path length of the optical fiber. This is detected by a high precision optical Time Domain Reflectometer (OTDR). This OTDR is often referred to as a Phase-OTDR or φ-OTDR, and measures changes in the distance between points of Rayleigh backscatter. This method is used in the Focus products from Network Integrity Systems and uses the method as shown for example in U.S. Pat. No. 9,002,149 (Rogers) assigned to Fotech Solutions Limited.

Some detection algorithms can include:

The arrangement shown in U.S. Pat. No. 7,634,387 (Murphy) issued Dec. 15, 2009 in which there is disclosed a detection algorithm used in the Network Integrity Systems Interceptor and Vanguard products wherein after predetermined amount of time of analyzing the ambient frequency signature of an environment, alarms are generated by frequency specific portions of the monitored signal crossing the reference threshold.

The arrangement shown in U.S. Pat. No. 11,055,984 (Murphy) issued Jul. 6, 2021 in which there is disclosed a detection algorithm set used by Network Integrity Systems where in a multidimensional matrix including frequency slices, time domain analysis, duration, and repetition rate are analyzed to detect an intrusion.

DAS tuning—proprietary tuning mechanisms as used by DAS manufacturers such as Fotech Ltd, where details are not publicly available.

The arrangement herein can also be used with other types of analysis of signals in an optical fiber such as Attenuation, interferometry and mechanical disturbance of fiber using a Fiber Bragg Grating (FBG).

There are multiple common intrusion possibilities in relation to perimeter sensing systems which need to be detected, particularly related to fence intrusion:

Fence fabric cut occurs when, in order to breach a perimeter or boundary defined by a fence such as a chain link fence, the intruder uses a tool to physical cut an opening into the fence fabric. This might be large such as for passage of personnel or vehicles, or small such as for passage of contraband or weapons.

Fence fabric lift occurs when an intruder lifts a portion of the fence fabric high enough to pass items or personnel. This might be done by simply grasping the fence at the bottom and lifting, or by outfitting a mechanical device such as a hoist or winch Fence climb occurs when the intruder physical climbs the fence fabric, passes over and either climbs down or jumps down on the far side.

The greatest challenge to monitoring a fence with a fiber optic vibration and motion detecting sensor is the detection of an intrusion in the presence of strong weather such as wind or rain. This is problematic for several reasons, including:

Rain can create impact events upon the sensor cable which, depending upon the sensitivity of the system, might be interpreted as an intrusion such as fabric cuts.

Wind creates a very powerful, broad frequency band excitation which can overwhelm the portions such as the optics or electronics of the monitoring system, rendering them unable to detect the subtleties of a stealthy intruder.

Wind creates signatures that are similar to climbs and lifts, causing large numbers of false alarms to be reported.

A common side effect of such false alarms is that the response team becomes unable to physically respond to the large number of alarms which are reported. In addition, the presence of such false alarms can cause the team to become inured to the repeated alarms over non-events which can lessen the frequency of response or lead to the response personnel simply ignoring the alarms entirely during the storms.

As is common in the industry, systems, unable to differentiate stealthy attacks in the presence of strong weather will actually suppress all alarms during the weather conditions concerned. However, this introduces a vulnerability where a nefarious operator with knowledge of the system can wait for a weather event for scheduling an intrusion.

SUMMARY OF THE INVENTION

According to the invention there is provided a method for monitoring an optical fiber for movements of the optical fiber indicative of intrusion events comprising:

introducing a monitoring optical signal into the optical fiber and receiving optical signals from the optical fiber which are modified by events on the perimeter security system which affect the optical fiber;

in a series of sequential cycles, causing an analysis of the received optical signals in the cycle to detect intrusion events by:

converting the received optical signals into an electrical signal;

converting the electrical signal into a sequence of digital samples;

using a transform function to convert the sequence of digital samples into a set of frequency dependent transform coefficients;

comparing the set of transform coefficients against an envelope where the envelope is a block of coefficients the same size as the set of transform coefficients;

and indicating an intrusion event if a transform coefficient exceeds an envelope coefficient by a predetermined threshold value;

and automatically changing a sensitivity of the analysis to accommodate environmental noise on the fiber by the steps of:

in respect of at least some of the analyses, when the transform coefficient is greater than the envelope coefficient but by a value less than the threshold value, changing the envelope coefficients to make the analysis less sensitive to accommodate increasing environmental noise conditions by increasing the envelope coefficients to a larger value;

and decaying the envelope coefficients over time by periodically reducing each envelope coefficient by a decay value so as to make the analysis more sensitive to accommodate decreasing environmental noise conditions by decreasing the envelope coefficients to a smaller value.

Preferably the larger value is equal to the amount of difference. That is, typically in the event that the transform coefficient is greater than the envelope coefficient by a measured difference (less than the threshold) then this actual difference is added to the envelope coefficient compared to make a new coefficient larger than the previous value. Thus of course a larger difference generated by a larger signal will act to change the envelope coefficient by a larger amount. In this way the envelope coefficients are arranged to follow the changing environmental conditions as these increase, for example in an increasing wind. However the system may be arranged so that the amount of the increase adopted is dependent on or proportional to difference as opposed to being equal to the difference.

In a preferred arrangement, the decay value is a predetermined constant value. The decay value is calculated geometrically or subtractively and is preferably the same for each transform coefficient. This decay value is thus in this arrangement a single constant value which is applied to each envelope coefficient for each cycle of the analysis.

As an alternative however, the decay value can be varied at different times or for different ones of the envelope coefficients in response to parameters determined by the analysis and/or in response to changes in the environment.

In addition or alternatively, the decay value may user configurable wherein use of a larger decay value makes the system become more sensitive faster. This can be selected as part of an initial tuning or set up process where the system is tuned to a specific fiber system to be monitored. This is true for a subtractive decay value, but for a geometric decay the user would select a smaller value to make the system become more sensitive faster.

In a particularly preferred end use of this system for which it is particularly designed, the system is arranged for use in monitoring a perimeter security system wherein the optical fiber extends along at least a part of the perimeter security system and said movements of the optical fiber are caused in response to intrusion events on the perimeter security system wherein the environmental noise conditions are caused by the effects of weather on the optical fiber. This is particularly effective for fence systems where the external fence is exposed to variable winds, rain and other environmental conditions. These events have frequency characteristics which make them particularly responsive to the automatic sensitivity adjustment system described herein. Thus the analysis can be designed and arranged by tuning operations to compensate for weather events sufficiently to detect standard intrusions in the presence of the weather conditions such as wind and rain.

As is known to the person skilled in this art, the transform function which generates the frequency related coefficients can use one of many analysis systems including a Fourier transform or a Wavelets transform, although Fourier Transforms is preferred and well known.

Preferably the analysis comprises comparing each transform coefficient of the set of transform coefficients against a respective associated one of a set of envelope coefficients of the block of coefficients and indicating an intrusion event if at least one transform coefficient exceeds the respective associated one of the envelope coefficients by the predetermined threshold value. That is preferably each one of the coefficients is compared and in the event that only one of them is different by the threshold, this will trigger an intrusion detection event to be communicated by conventional arrangements to the user.

Also in the automatic sensitivity adjustment, the analysis in each cycle comprises comparing each transform coefficient independently of the other coefficients so that, in the event that the transform coefficient being compared is greater than the envelope coefficient but by a value less than the threshold value, the envelope coefficient being compared is increased to the larger value defined by the difference. Thus the coefficients are treated independently of one another so that some may be increased while others are not. This system automatically compensates for the difference in frequency of the environmental effects where for example wind at high velocities may have a very different frequency characteristic from other events such as rain.

It will be appreciated therefore, that the present system operates to balance the increase of the envelope coefficients, caused by adopting the difference to be added to the existing coefficient to make the system less sensitive, with the ongoing decay of the envelope coefficients which occurs at each cycle. Typically the amount of the difference is greater than the selected decay value so that the system increases the envelope coefficients relatively quickly in a few cycles which are then decayed relatively slowly over time. This balancing of these two effects has been found to automatically control the sensitivity of the analysis in a way which allows the system to remain responsive to intrusion events even during high levels of environmental noise and then to return to the required levels to be sensitive to the intrusion events when the environmental noise decreases.

That is, as explained above, the envelope coefficients are increased to make the system less sensitive in response to the comparison where the transform coefficients are greater than the envelope coefficients and the envelope coefficients are decayed or decreased on an ongoing basis through each cycle of the analysis.

In accordance with one important feature the system is arranged so that, in respect of those analyses where an Intrusion is sensed, the envelope coefficients are not increased to the larger value but instead are retained at the existing value. The decay values can also be halted when an intrusion event is detected. Or the coefficient may still be decayed by the ongoing repeating decaying events. This avoids the situation where a high detected difference or a difference that goes on for an extended period of time causes the sensitivity to be reduced excessively in a manner which will take the decaying effect to take too long to bring the system back to the required balance.

In accordance with one important feature the system is arranged so that changing of the envelope coefficients to increase the envelope coefficients to a larger value is delayed by a time of a plurality of cycles. This can be done in a first in first out buffer (FIFO) which acts as a buffer and holds each value for a number of cycles or a set period of time. Thus for example the system may be run at a rate of 10 cycles per second and the FIFO acts as a delay of 2 or 3 seconds so that the delay can be as much as 20 cycles. The purpose of this is to prevent intrusions with a slow start from desensitizing the system. For example, a person getting ready to climb a fence may wiggle it gently such that it does not trigger an alarm, but is enough to desensitize the system which could cause the immediately following actual intrusion event to be missed. Thus the FIFO buffer acts to delays desensitization steps to ensure that there was no intrusion associated with it. If an intrusion is detected then all desensitization steps awaiting in or stored in the FIFO buffer are cancelled and not applied to the envelope.

In accordance with one important feature the system is arranged so that there is provided for each envelope coefficient a floor value and when envelope coefficients are decayed to a decay value below the floor value, that envelope coefficient is replaced with the floor value. Thus in this arrangement, the envelope floor value acts to prevent the analysis from becoming too sensitive to avoid false alarms from small events where a larger floor value makes the system less sensitive to small events including vibration and movement from small rodents, thermal expansion, and impact from small objects including raindrops, small hail, snow, small flying debris, etc. The floor value can be user configurable.

As set forth above, each cycle of the analysis acts to select a block of the digital samples of the incoming wave form. The digital samples thus form a sequence of blocks and these blocks are preferably selected to that they are of fixed size or length. For each cycle therefore the selected block of data is acted upon by the transform to generate a series of transform coefficients for that block. Again then is each cycle that transform coefficients so generated are compared to the set of envelope coefficients determined by the above system of increasing and decay.

Preferably the blocks are selected for the transform to be undertaken where the boundaries of the blocks are selected such that the blocks overlap.

As part of the analysis, the threshold value is user configurable wherein the sensitivity of the analysis is also controlled by adjusting the threshold. This is referring to the distance above the envelope that a measured coefficient must rise to qualify as an alarm. A larger value means that an attack has to be bigger to trigger an alarm (ie, larger value=less sensitive). This can be done as part of an installation process to adapt the system to the particular perimeter security involved.

Preferably the analysis is arranged to include subsequent detected intrusion events in subsequent cycles of the analysis into a single reported event. An intrusion attempt may take place over many cycles. Groups of nearby cycles that are in alarm are coalesced into a single alarm. If this is not done a single climb attempt could generate many alarms.

DETAILED DESCRIPTION

This invention is for a detection algorithm that compensates for weather sufficiently to maintain detection of the standard intrusions of climb, cutting and lifting in the presence of weather conditions such as wind and rain.

The system operates with the following flowchart outline where each step progresses to the next unless otherwise specified.

Optical Sensing
Digitization
Short Time Fourier Transform
Intrusion Check. Loop to 1 if alarm.
Envelope Desensitization
Envelope Decay
Envelope Flooring. Loop to 1.

Figure 1:
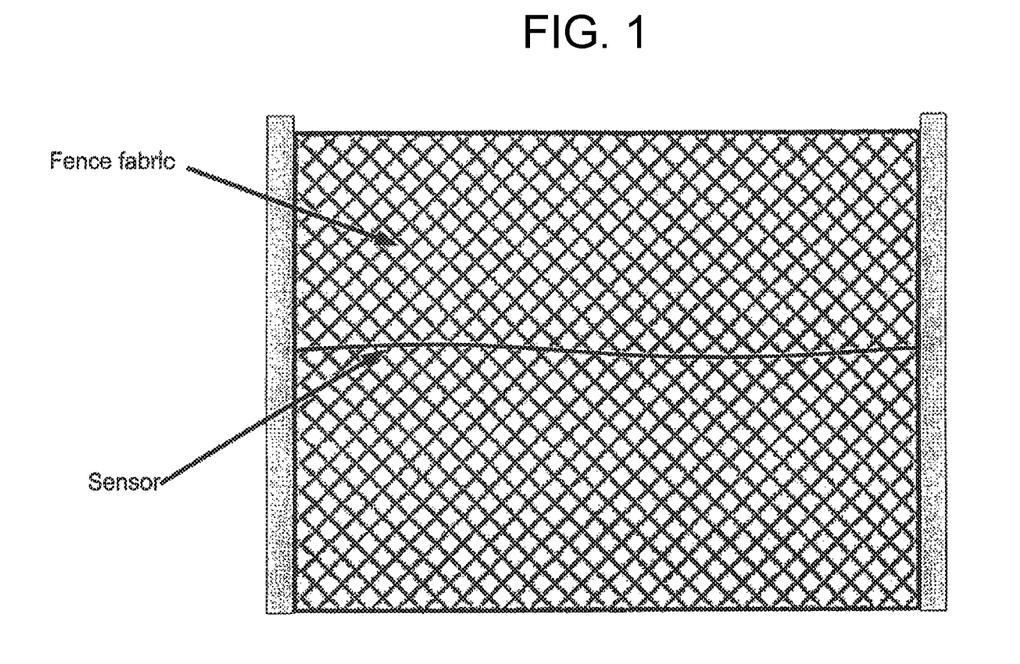
FIG. 1 shows a length of a perimeter fence which includes an optical fiber attached thereto which acts as a monitor of movements indicative of an intrusion event.

The optical sensing has the following characteristics:

There is an optical sensing system shown in FIG. 1 covering the protected perimeter. This can cover the whole perimeter or may be divided into sections such as particularly sensitive areas.

Figure 2:
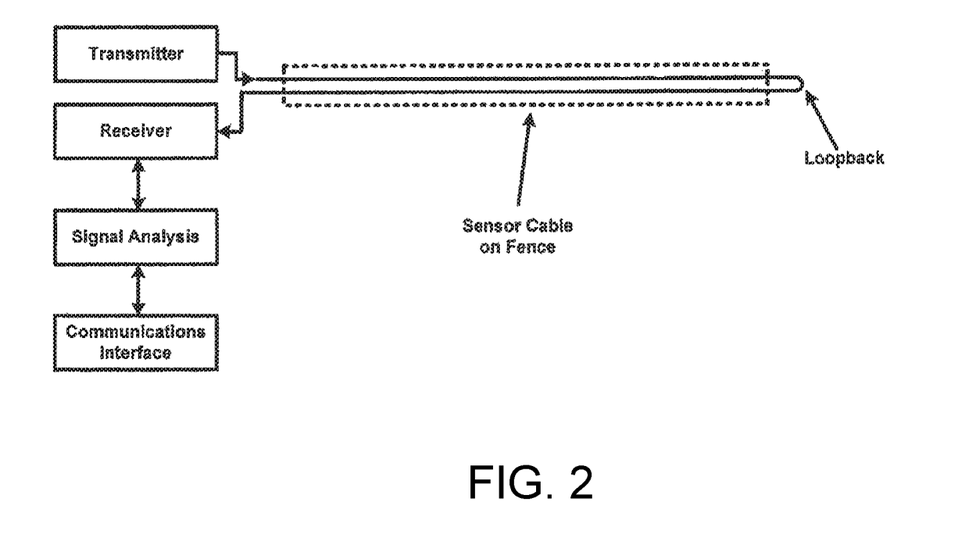
FIG. 2 shows schematically the basic components of the monitoring system.

The optical sensing system provided by the optical fiber is sensitive to vibration and movement. Thus the fiber acts to encode vibration and movement into the light passing through the monitoring fiber from a transmitter (FIG. 2) so that the signals transmitted are modified and returned by a loop back to a receiver at the head end. Alternately the receiver can be at the remote end.

Figure 3:
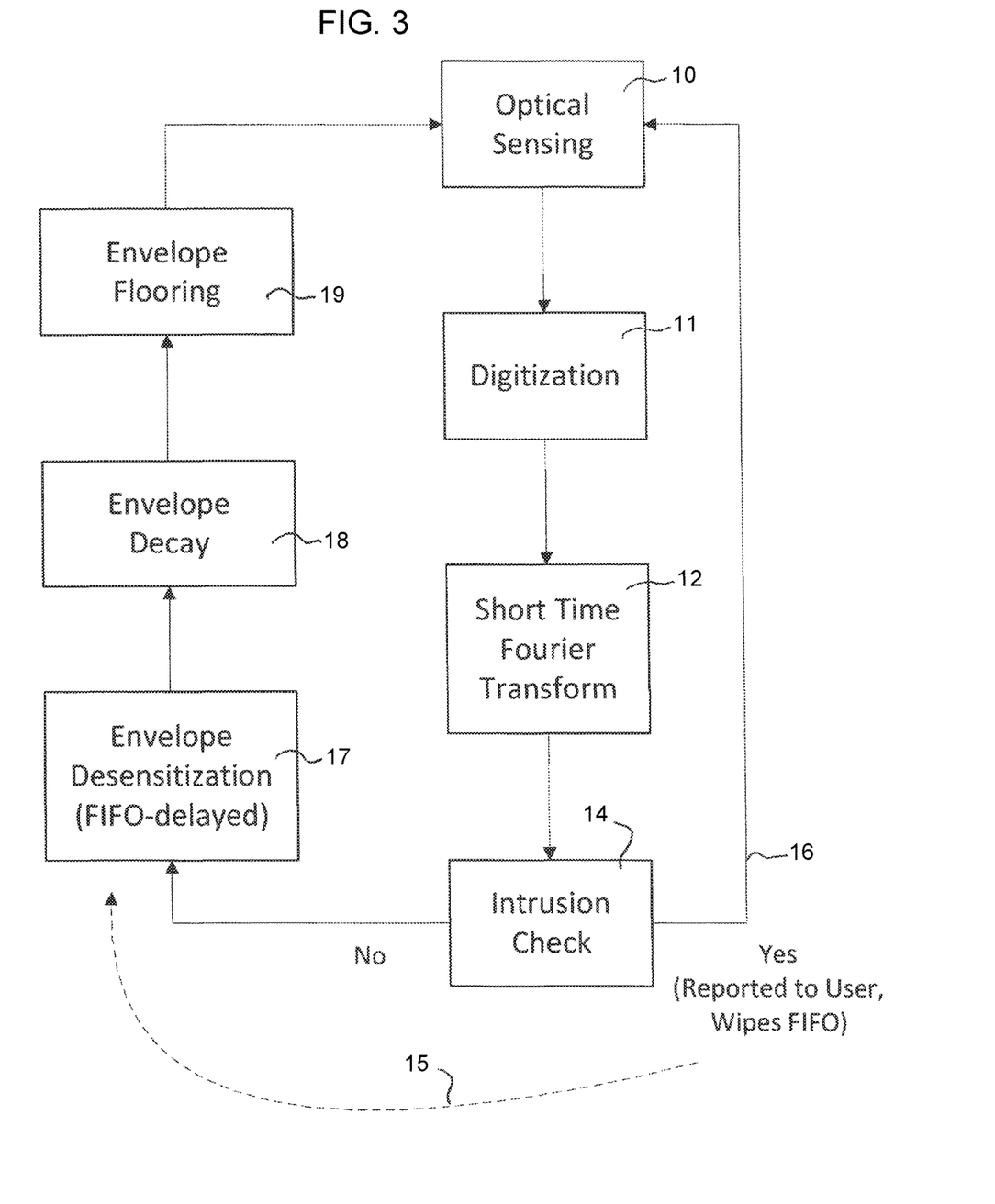
FIG. 3 is a flow chart showing the steps of the monitoring method according to the present invention.

The optical analysis system shown as a flow chart in FIG. 3 includes an optical sensing component 10 receiving the signals after modification by the movement of the fiber. The optical sensing system 10 converts encoded light shown in FIG. 4 into an electrical signal.

The electrical signal is converted into a sequence of digital samples by an Analog to Digital Converter 11 and the sequence of digital samples is conveyed to computer software for further analysis.

Figure 4:
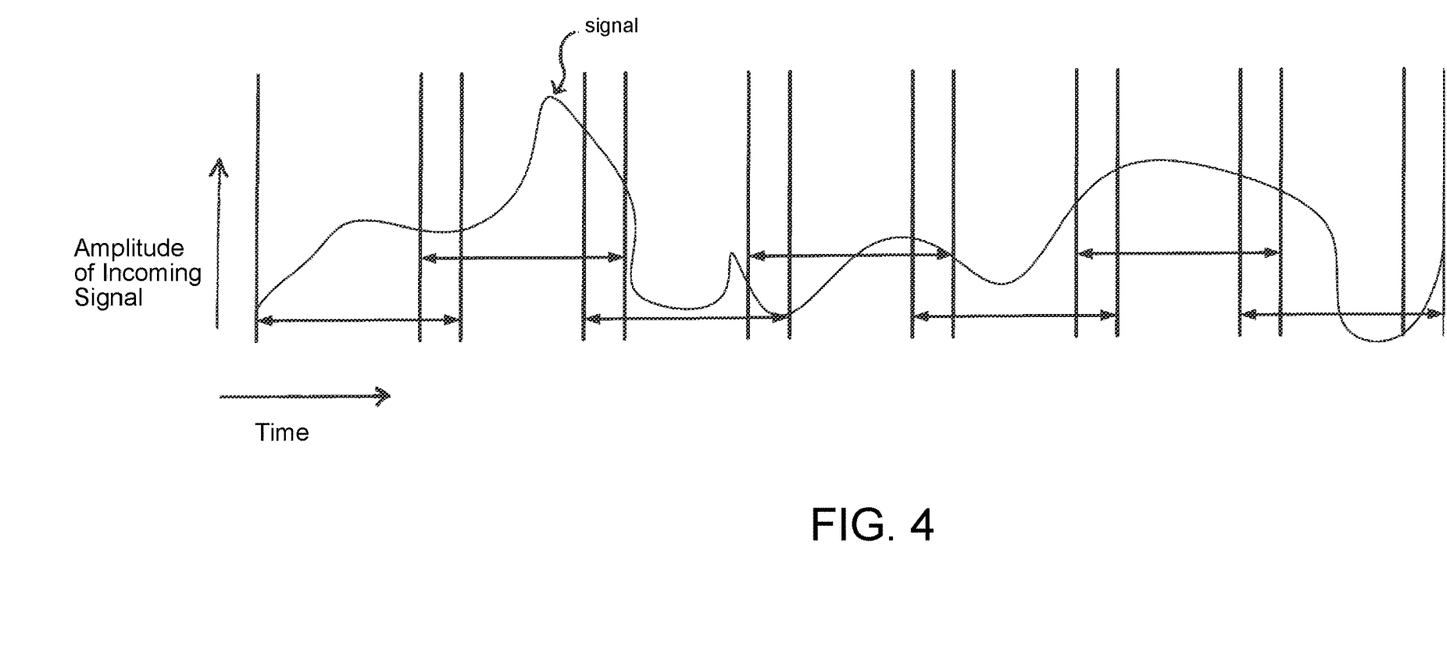
FIG. 4 shows a graph of an incoming signal received by the optical sensing component of FIG. 3.

In a Short Time Fourier Transform step 12, the sequence of digital samples from the signal shown in FIG. 4 is converted into a sequence of Fourier Transform coefficients. The incoming signal shown in FIG. 4 is first converted into a sequence of fixed-sized blocks as shown in FIG. 4. The boundaries of the blocks are selected such that the blocks overlap as shown. The sequence of digital samples obtained from the waveform are thus also formed into blocks. The blocks are of fixed or constant length. Each fixed sized block of samples has the Fourier Transform applied to generate the Fourier transform coefficients shown in FIGS. 7A to 7D.

Figure 5:
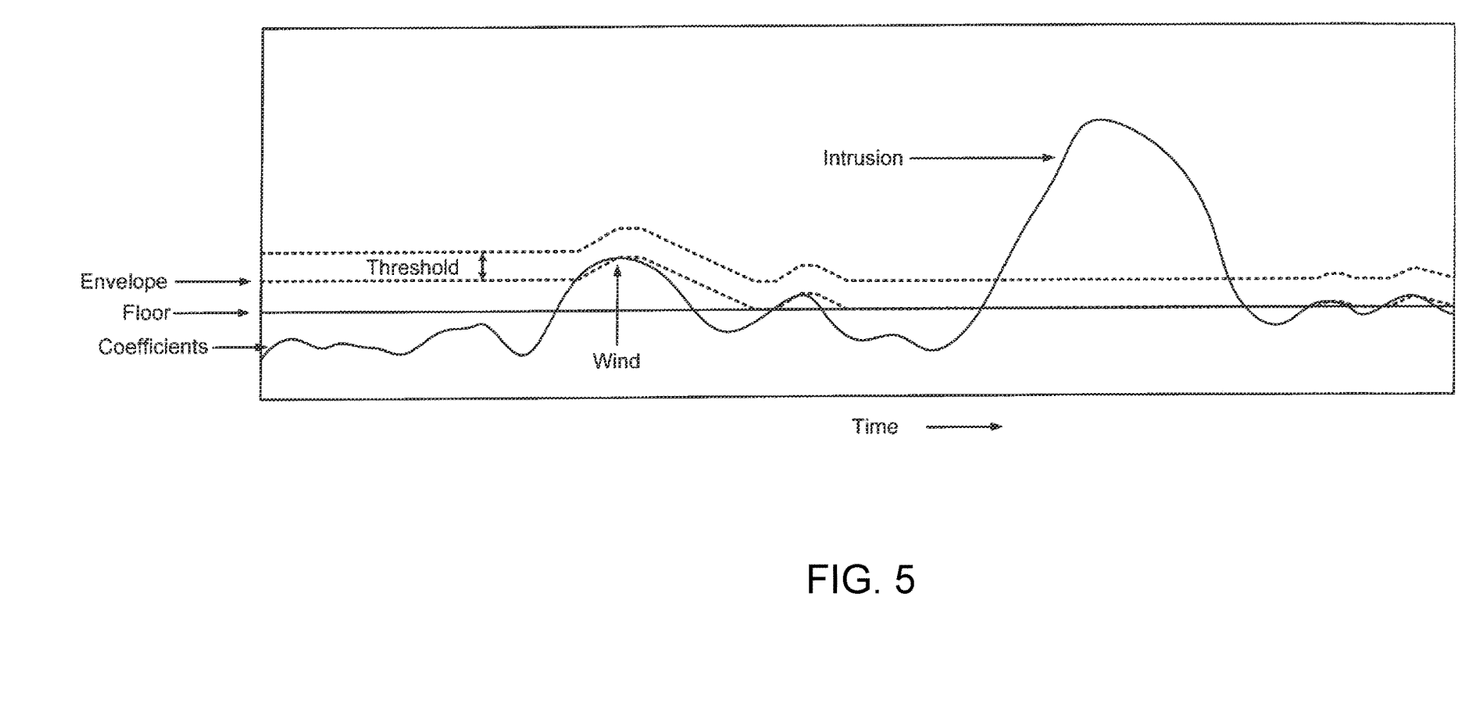
FIG. 5 is a graph showing schematically the comparison between the transform coefficients and the envelope coefficients to generate instruction detection events.
Figure 6:
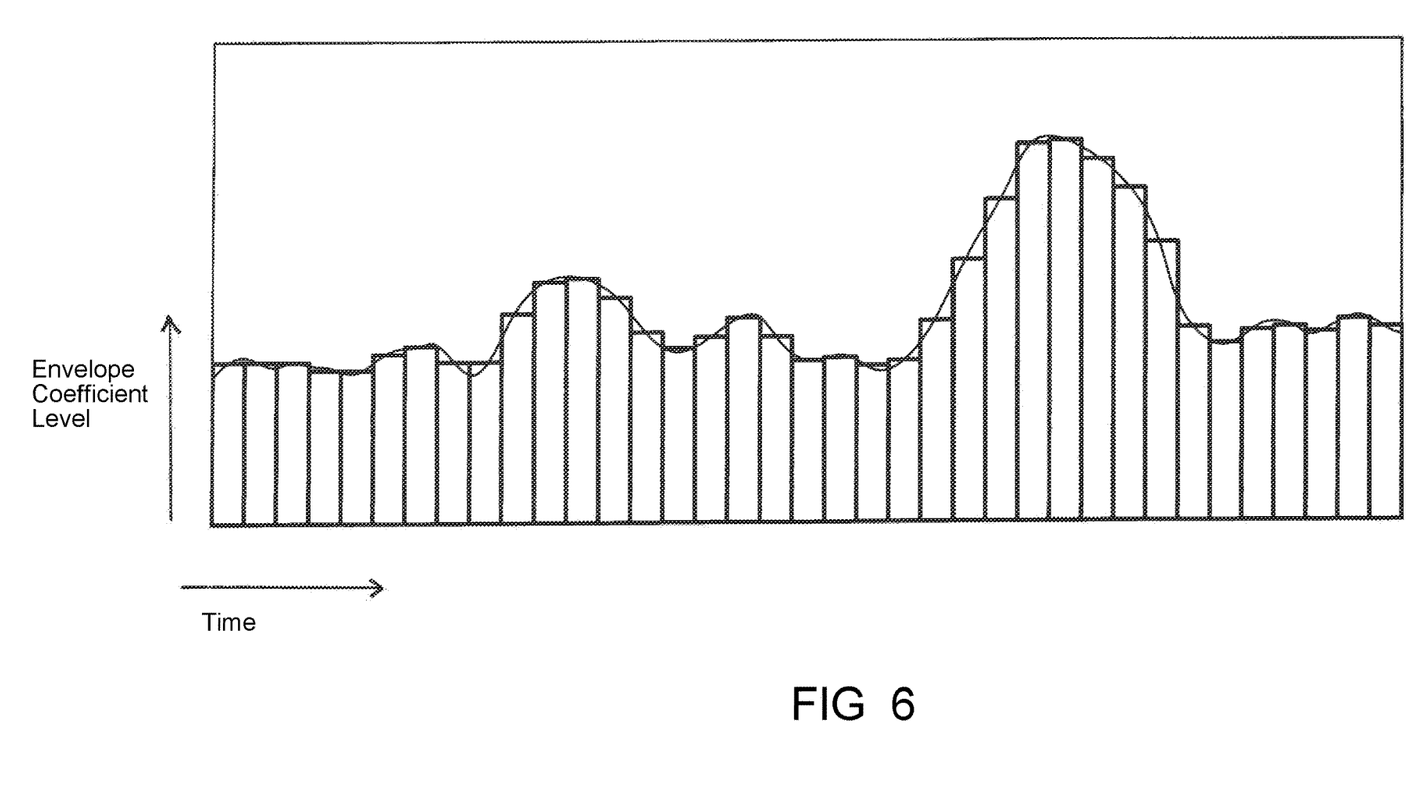
FIG. 6 shows a series of envelope coefficients for comparison with the transform coefficients from the analysis of the wave form.
Figure 7A:
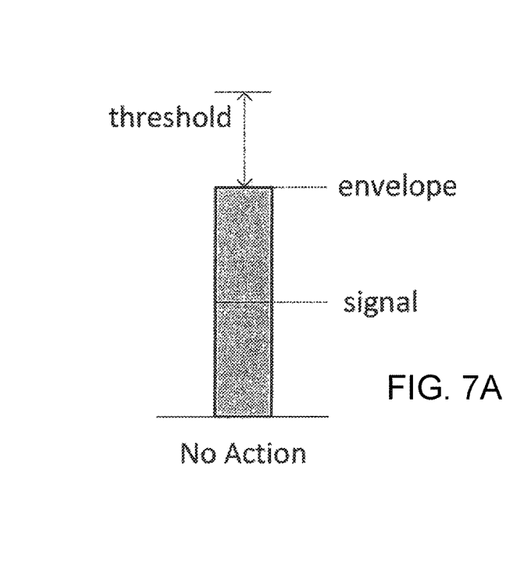
FIGS. 7A to 7E show a series of steps showing the comparison between the transform coefficients and the envelope coefficients together with the modification of the envelope coefficients which carry out the automatic sensitivity changes to accommodate environmental noise on the fiber according to the invention.
Figure 7B:
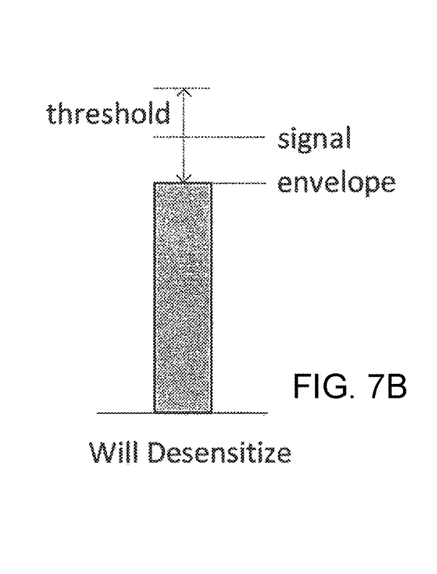
Figure 7C:
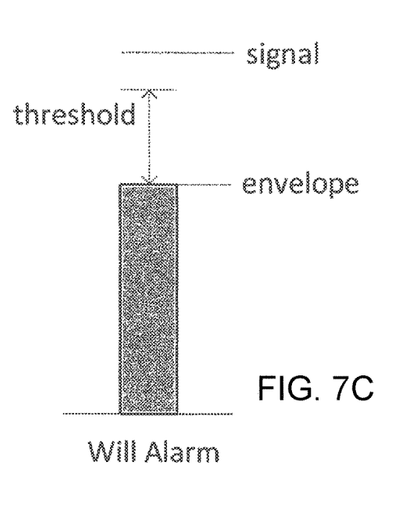

An intrusion event is sensed at step 14 by comparing the Fourier Transform coefficients of FIG. 5 against a series of Envelope coefficients shown in FIG. 6. The comparisons are shown in FIGS. 7B and 7C where the transform coefficient is shown at "signal" and the envelope with which is it compared is shown at "envelope". The Envelope is a block of numbers or coefficients where the block is the same size as the Fourier Transform and where corresponding or associated coefficients in the Envelope and Fourier Transform are compared.

As shown at step 14, an intrusion is sensed if one or more Fourier Transform coefficients exceeds its corresponding Envelope coefficient by a predetermined threshold which is set as a hard value in the programming or may be user configurable. If adjustable, the overall sensitivity of the system can be controlled by adjusting the threshold.

If an intrusion event is sensed by the comparison as shown in FIG. 7C, no further manipulation of the envelope coefficients is performed. That is as shown at link 15 in FIG. 3 where the indication of the intrusion event is communicated to the envelope coefficient management system described below so as to prevent further modification of the envelope values.

Any sensed intrusions are reported to the user along a link 16 thus bypassing the envelope management system described below.

The intrusion check system 14 may wait (not shown) after detection of an intrusion event for a short period of time to give time for further intrusion events to be detected thus allowing the system to absorb subsequent intrusion sense events into a single reported event.

The management of the Envelope coefficients in order to automatically change a sensitivity of the analysis to accommodate environmental noise on the fiber is shown by the steps 17, 18 and 19:

Thus the system can desensitize itself to accommodate increasing environmental noise conditions such as wind.

Figure 7D:
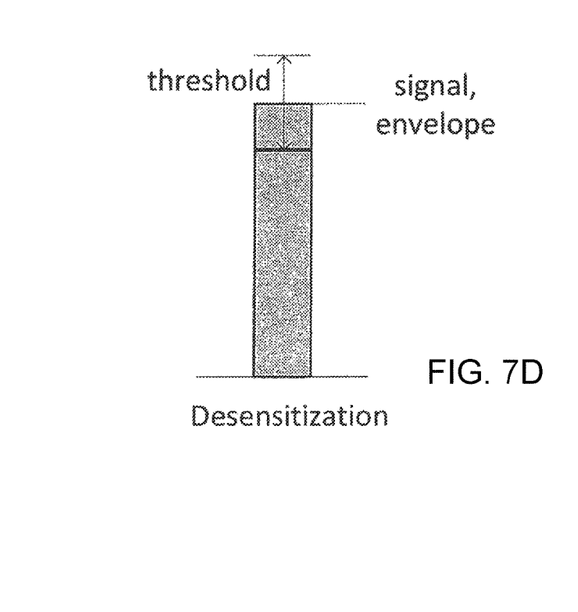

In step 17 and as shown in FIG. 7B, if the Fourier Transform coefficient (signal) is greater than the envelope, but the difference is less than the threshold which would trigger an intrusion event detection, the envelope coefficient is changed to become less sensitive. That is for each corresponding coefficient in the Envelope and Fourier Transform, the Envelope coefficient is changed, as shown in FIG. 7D, to adopt the larger value where the larger value is equal to the actual difference which was detected in FIG. 7B.

Figure 7E:
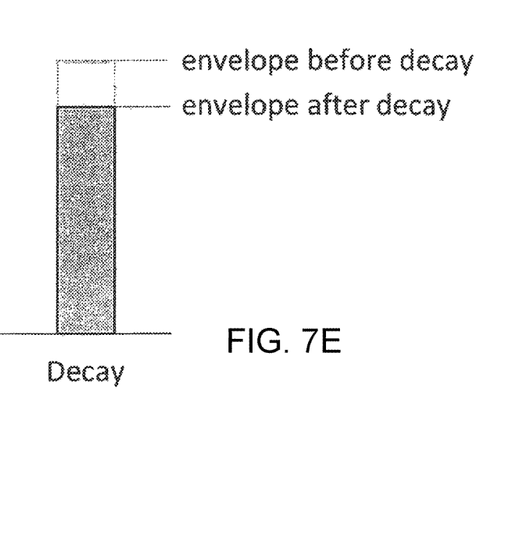

As part of the same envelope management, the system makes itself more sensitive to accommodate decreasing environmental noise conditions such as the waning of wind. That is, as shown in FIG. 7E, at each cycle of operation defined by analysis of the next block of data from the selected block of the signal, each coefficient in the set of the Envelope coefficients shrinks or is decayed and thus slowly becomes more sensitive over time on a step-by-step basis after each cycle. In other words, each coefficient in the Envelope is reduced by a small amount (Decay). The decay value can be a hard programmed value or may be user configurable. It will of course be appreciated that a change in the Decay value can be used to make the system become more sensitive faster or slower. As stated above this can be selected at an installation to best suit the system being monitored.

However to prevent the system from becoming too sensitive to avoid false alarms from small events, for each Envelope coefficient that falls below a present floor value, that coefficient is replaced with the floor value shown in FIG. 5. In this way the envelope coefficients are gradually and repeatedly decayed for each cycle until they reach a pre-set floor value whereupon the floor value is held. In this way, small events can be discarded and do not trigger an intrusion event detection. Such small events can include vibration and movement from small rodents, thermal expansion, and impact from small objects including raindrops, small hail, snow, small flying debris, etc.

The floor value may be pre-set or may be user configurable. Of course a larger floor value makes the system less sensitive to small events.

The balanced effects of the increase in the envelope value after a comparison and desensitization action at step 17 and after the gradual decay or decrease in the value at step 18 and the floor value control at step 19 thus act to provide new values or coefficients which are communicated to the intrusion check step 14.

As shown at step 17, the changing of the envelope coefficients to increase the envelope coefficients to a larger value is delayed by a time of a plurality of cycles by use of the FIFO described above.

The invention claimed is:

1. A method for monitoring an optical fiber for movements of the optical fiber indicative of intrusion events comprising:

introducing a monitoring optical signal into the optical fiber and receiving optical signals from the optical fiber which are modified by intrusion events on the perimeter security system which affect the optical fiber;

in a series of sequential cycles, causing an analysis of the received optical signals in the cycle to detect intrusion events by:

converting the received optical signals into an electrical signal;

converting the electrical signal into a sequence of digital samples;

using a transform function to convert the sequence of digital samples into a set of frequency dependent transform coefficients;

comparing the set of transform coefficients against an envelope where the envelope is a block of coefficients the same size as the set of transform coefficients;

and indicating an intrusion event on determination that a transform coefficient exceeds an envelope coefficient by a predetermined threshold value;

and automatically changing a sensitivity of the analysis to accommodate environmental noise on the fiber by the steps of:

in respect of at least some of the analyses, when the transform coefficient is greater than the envelope coefficient but by a value less than the threshold value, changing the envelope coefficients to make the analysis less sensitive to accommodate increasing environmental noise conditions by increasing the envelope coefficients to a larger value; and decaying the envelope coefficients over time by periodically reducing each envelope coefficient by a decay value so as to make the analysis more sensitive to accommodate decreasing environmental noise conditions by decreasing the envelope coefficients to a smaller value.

2. The method according to claim 1 wherein the decay value is a predetermined constant value.

3. The method according to claim 1 wherein the decay value is calculated geometrically or subtractively.

4. The method according to claim 1 wherein the decay value is the same for each transform coefficient.

5. The method according to claim 1 wherein the decay value is varied in response to parameters determined by the analysis and/or in response to changes in the environment.

6. The method according to claim 1 wherein the decay value is user configurable to change the system sensitivity faster or slower.

7. The method according to claim 1 for use in monitoring a perimeter security system wherein the optical fiber extends along at least a part of the perimeter security system and said movements of the optical fiber are caused in response to intrusion events on the perimeter security system wherein the environmental noise conditions are caused by the effects of weather on the optical fiber.

8. The method according to claim 7 wherein the analysis compensates for weather in a manner that allows detection of said intrusion events in the presence of said weather conditions.

9. The method according to claim 1 wherein the transform function comprises a Fourier transform or a Wavelet transform.

10. The method according to claim 1 wherein the analysis comprises comparing each transform coefficient of the set of transform coefficients against a respective associated one of a set of envelope coefficients of the block of coefficients and indicating an intrusion event if at least one transform coefficient exceeds the respective associated one of the envelope coefficients by the predetermined threshold value.

11. The method according to claim 1 wherein the analysis in each cycle comprises comparing each transform coefficient independently of the other coefficients and when the transform coefficient being compared is greater than the envelope coefficient but by a value less than the threshold value, changing the envelope coefficient being compared to a larger value.

12. The method according to claim 1 wherein, in respect of those analyses where an intrusion event is detected, the envelope coefficients are not increased to a larger value.

13. The method according to claim 1 wherein said changing of the envelope coefficients to increase the envelope coefficients to a larger value is delayed by a time of a plurality of cycles.

14. The method according to claim 13 wherein said changing of the envelope coefficients is delayed by storage of values in a buffer and wherein, in the situation where an intrusion event is detected, the values stored in the buffer are discarded.

15. The method according to claim 1 wherein there is provided for each envelope coefficient a floor value and when envelope coefficients are decayed to a decay value below the floor value, that envelope coefficient is replaced with the floor value.

16. The method according to claim 15 wherein the floor value acts to prevent the analysis from becoming too sensitive to avoid false alarms from small intrusion events where a larger floor value makes the system less sensitive to small intrusion events including vibration and movement.

17. The method according to claim 16 wherein the floor value is user configurable.

18. The method according to claim 1 wherein the digital samples comprise a sequence of blocks which can be of fixed or variable size.

19. The method according to claim 18 wherein the boundaries of the blocks are selected such that the blocks overlap.

20. The method according to claim 1 wherein the threshold is user configurable wherein the sensitivity of the analysis is controlled by adjusting the threshold.

21. The method according to claim 1 wherein the analysis is arranged to include subsequent detected intrusion events into a single reported event.

* * * * *